United States Patent
Tseng et al.

(10) Patent No.: US 10,015,370 B2
(45) Date of Patent: Jul. 3, 2018

(54) METHOD FOR SYNCHRONIZING VIDEO AND AUDIO IN VIRTUAL REALITY SYSTEM

(71) Applicant: HTC Corporation, Taoyuan (TW)

(72) Inventors: Mong-Yu Tseng, Taoyuan (TW);
Iok-Kan Choi, Taoyuan (TW);
Jing-Lung Wu, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 15/222,146

(22) Filed: Jul. 28, 2016

(65) Prior Publication Data

US 2017/0064154 A1   Mar. 2, 2017

Related U.S. Application Data

(60) Provisional application No. 62/210,843, filed on Aug. 27, 2015.

(51) Int. Cl.
*H04N 5/04* (2006.01)
*G06T 19/00* (2011.01)
*H04N 7/10* (2006.01)
*H04N 21/43* (2011.01)
*H04N 21/85* (2011.01)
*H04N 21/422* (2011.01)
*H04N 21/8547* (2011.01)

(52) U.S. Cl.
CPC ............ *H04N 5/04* (2013.01); *G06T 19/006* (2013.01); *H04N 7/10* (2013.01); *H04N 21/42202* (2013.01); *H04N 21/4307* (2013.01); *H04N 21/8547* (2013.01)

(58) Field of Classification Search
CPC .. H04N 5/04; H04N 21/8547; H04N 21/4307; H04N 21/42202; H04N 7/10; G06T 19/006
USPC ....... 725/87, 32; 348/500, 515, 158; 700/94; 386/201
See application file for complete search history.

(56) References Cited

U.S. PATENT DOCUMENTS

| | | |
|---|---|---|
| 5,990,405 A | 11/1999 | Auten et al. |
| 8,284,310 B2 | 10/2012 | Mallinson |
| 2006/0053455 A1* | 3/2006 | Mani ............ G11B 27/10 725/87 |

(Continued)

FOREIGN PATENT DOCUMENTS

TW    201205121 A1    2/2012

*Primary Examiner* — Paulos M Natnael
*Assistant Examiner* — Sean Haiem
(74) *Attorney, Agent, or Firm* — Birch, Stewart, Kolasch & Birch, LLP

(57) ABSTRACT

A method for audio-video synchronization in a virtual reality (VR) system is provided. The VR system includes a VR device and a host device. The method includes the steps of: connecting the VR device to a host device via a data transmission interface; transmitting an audio signal and a video signal from the host device to the VR device; estimating time delay information in an audio transmission path and a video transmission path of the VR device; transmitting a feedback signal recording the time delay information from the VR device to the host device; and adjusting timing of the audio signal or the video signal transmitted from the host device to the VR device according to the feedback signal.

20 Claims, 9 Drawing Sheets

(56) References Cited

U.S. PATENT DOCUMENTS

| | | | |
|---|---|---|---|
| 2011/0181776 A1* | 7/2011 | Mallinson | H04N 5/04 348/515 |
| 2013/0141421 A1* | 6/2013 | Mount | H04N 21/41407 345/419 |
| 2014/0092254 A1* | 4/2014 | Mughal | G11B 27/031 348/158 |
| 2014/0259050 A1* | 9/2014 | Goldberg | H04N 21/2368 725/32 |
| 2015/0301788 A1* | 10/2015 | Johnston | G05B 15/02 700/94 |
| 2015/0348591 A1* | 12/2015 | Kaps | G11B 27/17 386/201 |

* cited by examiner

METHOD FOR SYNCHRONIZING VIDEO AND AUDIO IN VIRTUAL REALITY SYSTEM

CROSS REFERENCE TO RELATED APPLICATIONS

This application claims the benefit of U.S. Provisional Application No. 62/210,843, filed at Aug. 27, 2015, the entirety of which is incorporated by reference herein.

BACKGROUND OF THE INVENTION

Field of the Invention

The invention relates to audio/video systems, and, in particular, to a method for synchronizing video data and audio data in a virtual reality (VR) system including a VR device and a host device.

Description of the Related Art

Displays with virtual image generation are often used in display devices which are located close to the user's eyes. These are called near-to-eye displays. Such display devices are known, for example, as head mounted displays (HMD).

An HMD is a display device that a person wears on the head in order to have video information directly displayed in front of the eyes. An HMD has either one or two small CRT, LCD or OLED displays with magnifying lenses and other optical elements. The displays and optics are typically embedded in a helmet, glasses, or a visor, which the user can wear. Lenses and other optical components are used to give the user the perception that the images are coming from a greater distance, and to prevent eyestrain.

The display video data, images, or frames are generated and output by a host device. When the host device transmits the video data and associated audio data to a VR device, non-synchronization (or audio drift) between the audio data and video data may occur because the processing time in the audio transmission path may differ from that in the video transmission path. That is, the audio path delay and the video path delay can be different. Differing delays between the audio transmission path and the video transmission path can cause the audio portion of the content and the video portion of the content to become "out of sync" in time (i.e. the audio lagging behind the video, or with the video delayed with respect to the audio), and the time mismatch between the audio data and the video data can cause significant distraction and dissatisfaction to the viewer. Accordingly, there is demand for a method for synchronizing the video data and audio data in a virtual reality (VR) system including a VR device and a host device.

BRIEF SUMMARY OF THE INVENTION

A detailed description is given in the following embodiments with reference to the accompanying drawings.

In an exemplary embodiment, a method for audio-video synchronization in a virtual reality (VR) system is provided. The VR system includes a VR device and a host device. The method includes the steps of: connecting the VR device to a host device via a data transmission interface; transmitting an audio signal and a video signal from the host device to the VR device; estimating time delay information in an audio transmission path and a video transmission path of the VR device; transmitting a feedback signal recording the time delay information from the VR device to the host device; and adjusting timing of the audio signal or the video signal transmitted from the host device to the VR device according to the feedback signal.

In another exemplary embodiment, a virtual reality (VR) system is provided. The VR system includes a host device and a VR device. The VR device is connected to the host device via a data transmission interface. The host device transmits an audio signal and a video signal to the VR device, and the VR device estimates time delay information in an audio transmission path and a video transmission path of the VR device. The VR device transmits a feedback signal recording the time delay information to the host device, and the host device adjusts timing of the audio signal or the video signal transmitted to the VR device according to the feedback signal, thereby synchronizing the audio signal and the video signal in the VR device.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
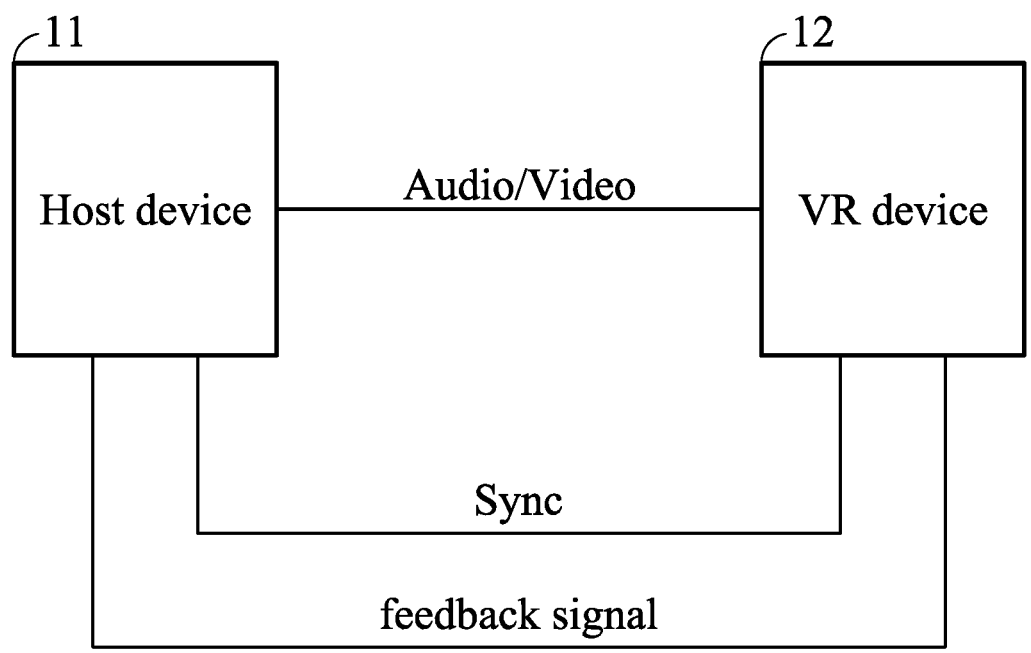
FIG. 1 is a schematic diagram showing interactions between a host device and a VR device in accordance with an embodiment of the invention.

FIG. 1 is a schematic diagram showing interactions between a host device and a VR device in accordance with an embodiment of the invention. The host device 11 first synchronizes with the VR device 12, and then transmits audio data and video data to the VR device 12. The VR device 12 outputs a feedback signal to the host device 11 and the host device 11 controls the timing for transmitting the audio data and video data according to the feedback signal, thereby ensuring that the video data displayed on the VR device 12 and the audio data output by the VR device 12 are synchronized.

Since the processing time and transmission time of the audio data in the audio transmission path are different from those of the video data in the video transmission path in the VR device 12, the feedback signal comprises two different data indicating the delay of the audio data and the delay of the video data, respectively. In another embodiment, the feedback signal includes time delay information between the audio data and the video data.

In one embodiment, the host device 11 will delay the audio data or the video data that are output to the VR device 12. In another embodiment, the host device 11 may increase the transmission speed of the audio data or the video data to the VR device 12 until the audio data have been synchronized with the video data played in the VR device 12.

Figure 2:
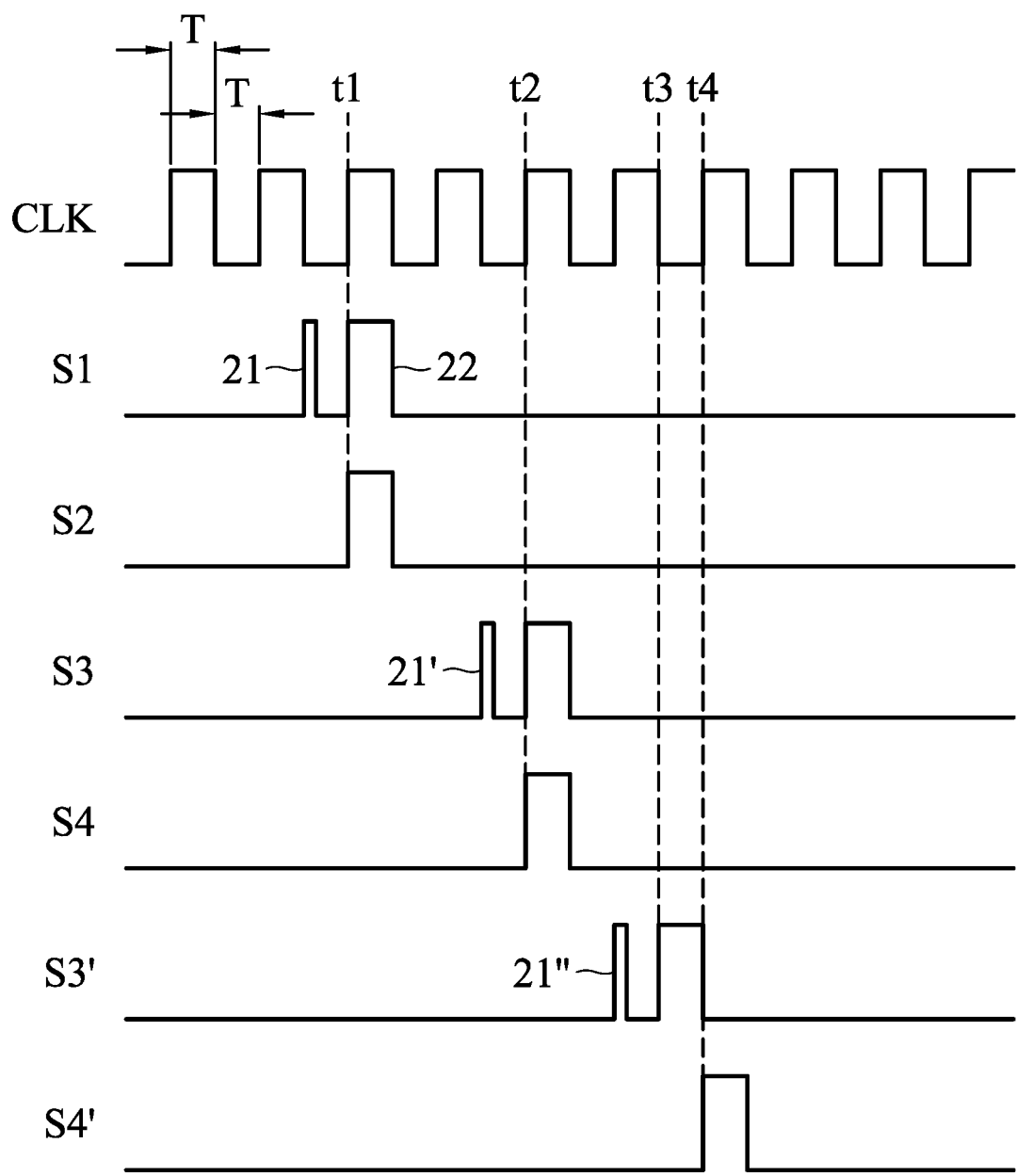
FIG. 2 is a waveform diagram for showing a data flow between the host device and the VR device in accordance with an embodiment of the invention.

FIG. 2 is a waveform diagram for showing a data flow between the host device and the VR device in accordance with an embodiment of the invention. The clock signal CLK is generated by the host device 11 and can be used to synchronize with the VR device 12. The signal S1 is the audio signal output by the host device 11. The signal S2 is the video signal output by the host device 11. The signal S1 comprises an audio pattern 21 indicating the timing when the audio signal is output from the host device 11. In this embodiment, the audio pattern 21 is mixed with the main audio signal 22. The audio pattern 21 is an audio signal with a specific tone or frequency. When an audio decoder of the VR device 12 detects the audio pattern 21, a detection signal is generated by the audio decoder to inform a controller of the VR device 12 to transmit a feedback signal to the host device 11. In this embodiment, operations for the audio signal and video signal are explained separately. However, the audio signal and the video signal may be integrated into one signal, such as a digital data packet.

The signal S3 shows the timing when the audio signal is received by the VR device 12. The signal S4 shows the timing when the video signal is received by the VR device 12. The signal S3' shows the timing when the audio signal has been processed by the VR device 12 and is ready to be played. The signal S4' shows the timing when the video signal has been processed by the VR device 12 and is ready to be displayed. It can be found that non-synchronization occurs between the signal S3' and the signal S4'. The VR device 12 transmits the time delay T between the signal S3' and the signal S4' to the host device 11, and the host device 11 will delay the audio signal for a time period T after receiving the time delay information.

In the embodiment of FIG. 2, an audio pattern 21 with a special tone is used for detecting the timing of the audio signal S1. A timestamp is used for the video signal S2 to detecting the timing of the video signal S2. The timestamp is a parameter included or embedded in the video signal S2. For example, when the video signal S2 is output by the host device 11, a first timestamp corresponding to time t1 is added to the video signal S2. At time t4, the VR device 12 has decoded or demodulated the received video signal S3 and generates a time feedback signal. The time feedback signal may be a second timestamp corresponding to time t4. In another embodiment, the time feedback signal may record a first time interval between time t1 and time t4. In another embodiment, the time feedback signal may record a second time interval between time t3 and time t4.

In view of the above, the VR device 12 transmits the feedback signal including time delay information to the host device 11, and the host device 11 adjusts the timing of video or audio data transmission based on the feedback signal from the VR device 12.

Figure 3:
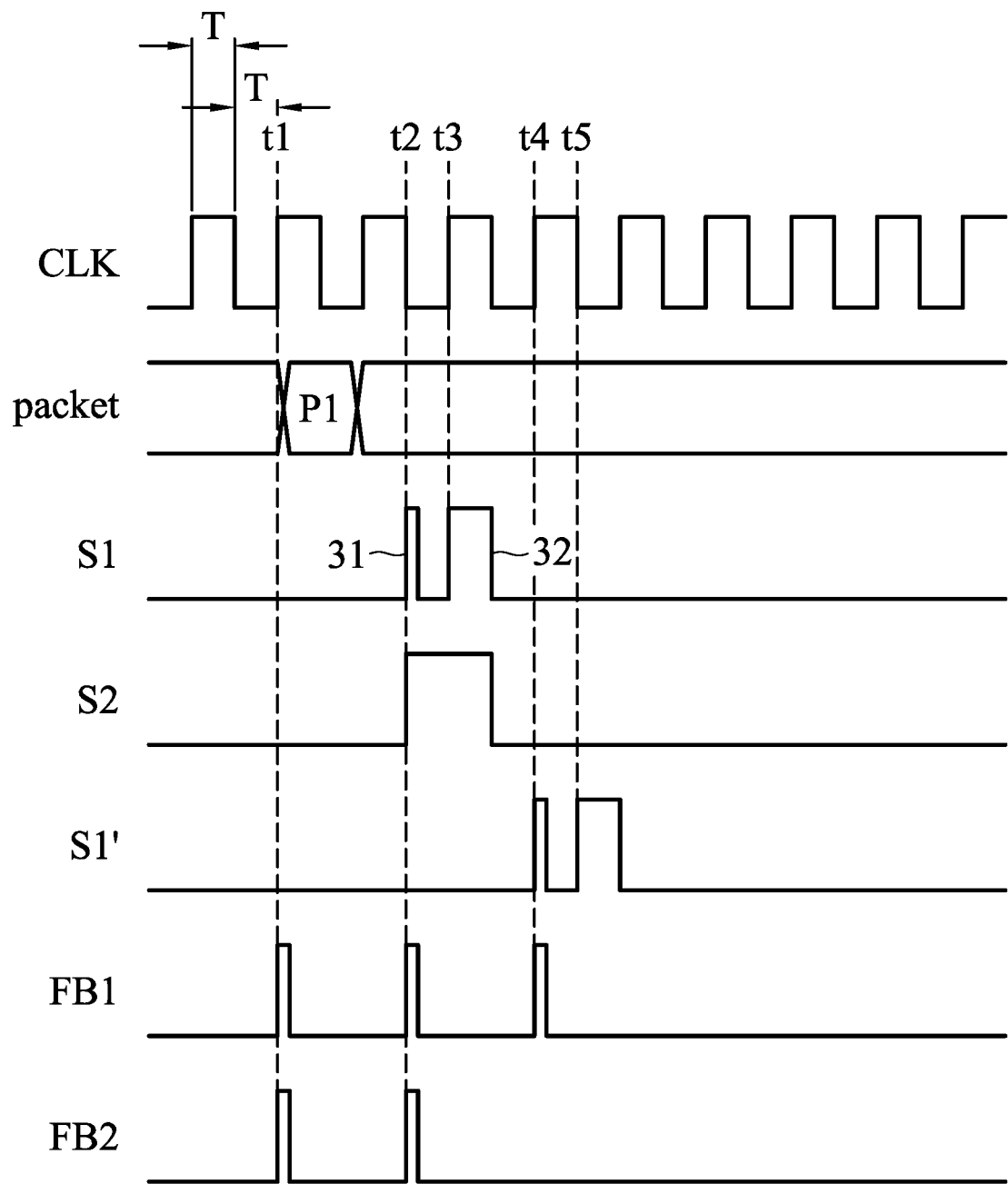
FIG. 3 is a waveform diagram for showing a data flow between the host device and the VR device in accordance with another embodiment of the invention.

FIG. 3 is a waveform diagram for showing a data flow between the host device and the VR device in accordance with another embodiment of the invention. In this embodiment, the video and the audio are integrated into one packet. When the VR device 12 receives the packet from the host device 11, a demodulator of the VR device 12 demodulates the received packet to generate the audio data S1 and the video data S2. The audio data S1 includes an audio sync signal 31 with a specific tone, and the video data S2 is integrated with a timestamp. The host device 11 determines whether the audio signal and the video signal played by the VR device 12 are synchronized according to the audio sync signal and the timestamp.

The clock signal CLK is generated by the host device 11 and may be used to synchronize with the VR device 12, and the clock signal CLK has a clock period of 2T. For example, the packet P1 is transmitted to the VR device 12 at time t1. The demodulator of the VR device 12 demodulates the packet P1 to generate the audio data S1 and the video data S2 at time t2. In this embodiment, the main audio pattern 32 is generated at time t3, for example. In another embodiment, the audio sync pattern 31 may be mixed with the main audio pattern 32. In one embodiment, the delay interval (t3-t2) between the audio data S1 and the video data S2 can be ignored. In another embodiment, the delay interval (t3-t2) will be considered by the host device 11.

The demodulated audio signal S1 is not ready to be played by a speaker of the VR device 12. The audio signal S1 is fully decoded by an audio encoder/decoder (codec) of the VR device 12 at time t4 and the decoded audio signal S1' is generated by the audio codec at time t4 and is ready to be played.

The signal FB1 represents the timing of the audio signal at different stages. The signal FB2 represents the timing of the video signal at different stages. The signals FB1 and FB2 are transmitted to a timestamp module to generate timestamp data. The host device 11 controls the transmission timing of the audio signal and video signal according to the timestamp data. In one embodiment, the host device 11 delays the video signal for 4T (t5-t2) or 3T (t4-t2).

Since the data transmitted between the host device 11 and the VR device 12 is in form of packets, the host device 11 may change the content of the packet based on practical situations. Assuming that the video signal is arranged in frames, each packet includes one frame, and the host device 11 transmits one packet every period of T. However, the audio data and video data in the same packet may have a 4-frame or 3-frame delay, thereby achieving synchronization between the audio signal and video signal in the VR device 12. Please refer to FIG. 4 for details.

Figure 4:
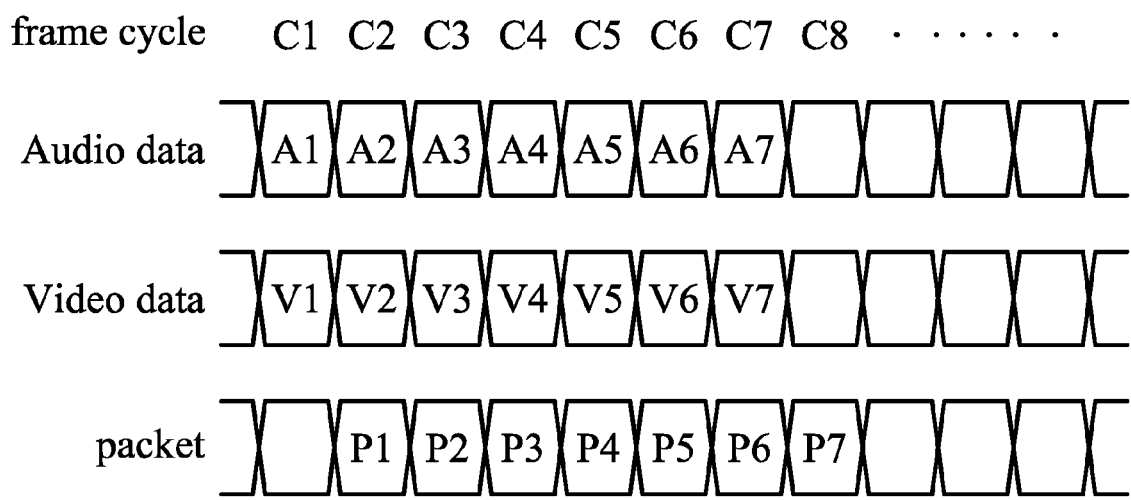
FIG. 4 is a waveform diagram of the audio data, video data, and the packet in the host device 11 in accordance with an embodiment of the invention.

FIG. 4 is a waveform diagram of the audio data, video data, and the packet in the host device 11 in accordance with an embodiment of the invention. Referring to FIG. 4, the audio data and video data are in form of digital data, but not limit the invention thereto. The audio data and the video data cannot be packed into a packet until the audio data and the video data are fully generated. For example, the audio data A1 and the video data V1 are fully generated after the first clock cycle C1, and the host device 11 is capable of packing the audio data A1 and video data V1 into the packet P1 and transmitting the packet P1 to the VR device 12 at the second clock cycle C2.

In an embodiment, when no non-synchronization event (i.e. the audio signal and video signal are not synchronized) occurs in the VR device 12, the host device 11 may transmit the packet to the VR device 12, where the packet P1 includes the audio data A1 and the video data V1, the packet P2 includes the audio A2 and the video data V2, and so on, as shown in FIG. 4. When a non-synchronization event occurs in the VR device 12, the host device 11 will change the content in the packet to be transmitted to the VR device 12.

Assuming the host device 11 detects the non-synchronization event after transmitting the packet P3, the host device 11 will change the content in the next packet P4. The host device 11 first determines the delay between the audio data and the video data. If the audio data has a 2T delay after the video data, the original video data V4 in the packet P4 is replaced by video data V2, the original video data V5 is the packet P5 is replaced by video data V3, and so on. If the video data has a 2T delay after the audio data, the audio video data A4 in the packet P4 is replaced by audio data A2, the original audio data A5 is the packet P5 is replaced by audio data A3, and so on. The embodiment of FIG. 4 is only for illustrating the invention, and does not limit the invention thereto. A person skilled in the art can choose any data synchronization method, adding dummy data for example, based on the actual design requirements.

Figure 5:
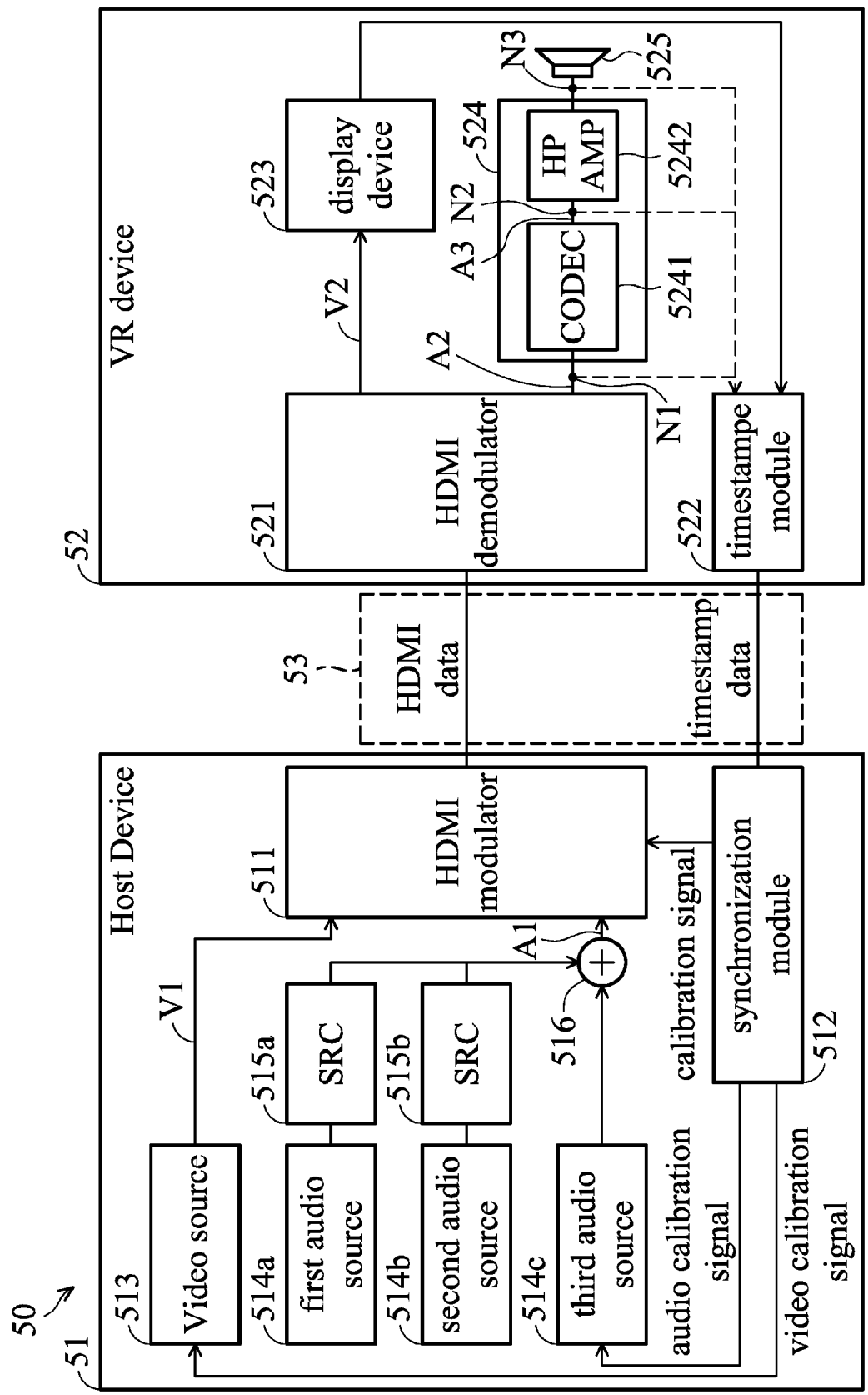
FIG. 5 is a schematic diagram of a system with a host device and a VR device in accordance with an embodiment of the invention.

FIG. 5 is a schematic diagram of a system with a host device and a VR device in accordance with an embodiment of the invention. Referring to FIG. 5, an HDMI interface 53 is used to connect the host device 51 and the VR device 52 in the system 50, but the invention is not limited thereto. In an embodiment, the connection between the host device 51 and the VR device 52 is wired (e.g. through the HDMI interface 53). Alternatively, a wireless communication protocol is used to establish the connection between the host device 52 and the VR device 52. In the embodiment, the host device is a computer. Alternatively, the host device 51 is a portable device that can be placed into a slot of the VR device 52.

In FIG. 5, three audio sources 514a, 514b and 514c are provided for illustration. In an embodiment, the sampling rate conversion units (SRCs) 515a and 515b are optional. The mixer 516 receives and mixes the first audio signal from the first audio source 514a, the second audio signal from the second audio source 514b and the third audio signal from the third audio source 514c into an audio signal A1. The audio signal A1 is transmitted to the HDMI modulator 511 to generate the HDMI data. In the embodiment, the host device 51 determines whether the third audio signal is synchronized with the video signal from the video source 513.

The user may use the VR device 52 to play a VR game, and the video source 513 and the third audio source 514c provides the audio data and video data required for the VR game. The first audio source 514a provides on-line voice communication between users using software, such as Raid-Call, Skype, etc. The second audio source 514b may be a system voice source of the host device 51. For example, when the host device 51 receives an incoming email, the host device 51 generates a corresponding voice signal via the second audio source 514b to inform the user who is playing the VR game. In another embodiment, when the host device 51 receives an incoming internet call, the host device 51 generates another corresponding voice signal via the second audio source 514b to inform the user who is playing the VR game. In another embodiment, one of the first audio source 514a and the second audio source 514b generates an audio pattern, such as the audio pattern 21 in FIG. 2 or the audio pattern 31 in FIG. 3. A human is more sensitive to sounds in a frequency range from 20 Hz to 5 KHz. If the frequency of the audio pattern is within that frequency range, other audio voice signals will be affected by the audio pattern. Therefore, it is preferred that an audio pattern having a frequency higher than 5K Hz be generated.

The HDMI modulator 511 receives the audio data from the mixer 516 and the video data from video source 513 to generate and transmit the HDMI data to the VR device 52, wherein the HDMI data is in form of data packets. The video data from the HDMI demodulator 521 are in form of frames, for example, and each frame includes a timestamp for synchronization. Each timestamp records time information when the associated video frame is generated and output to the HDMI modulator 511. In another embodiment, the HDMI modulator 511 may change the timestamp to indicate time information when the HDMI data is generated. In addition, the audio signal A1 output from mixer 516 includes an audio pattern for synchronization.

When the audio pattern of the audio signal A1 is generated, the synchronization module 512 starts counting clock cycles for audio delay. After the HDMI demodulator 521 demodulates the received HDMI data to generate the audio data A2, The HDMI demodulator 521 further transmits a timestamp associated with the audio data A2 to the timestamp module 522, and the timestamp module 522 further forwards the timestamp associated with the audio data A2 to the synchronization module 512. When the synchronization module 512 has received the timestamp associated with the audio data A2, the synchronization module 512 stops counting and acquires a first delay (e.g. in clock cycles) between the audio signal A1 and its associated audio data A2 (i.e. an audio path delay in the audio transmission path).

Similarly, after the HDMI demodulator 521 demodulates the received HDMI data to generate the video data, The HDMI demodulator 521 further transmits the generated video data V2 to the display device 523. The HDMI demodulator 521 or the display device 523 may also transmit a timestamp associated with the video data V2 to the timestamp module 522. The timestamp module 522 then forwards the timestamp associated with the video data to the synchronization module 512, and the synchronization module 512 calculates a second delay between the video signal V1 and the video data V2 (i.e. an video path delay in the video transmission path). The synchronization module 512 generates an audio calibration signal and/or a video calibration signal based on the first delay and the second delay.

In one embodiment, the synchronization module 512 and the timestamp module 522 can be implemented by a processor, a hardware circuit, firmware, software, or a processing device executing corresponding firmware or software.

In one embodiment, the third audio source 514c delays the output audio data based on the audio calibration signal, and the video source 513 delays the output video data based on the video calibration signal. In another embodiment, the synchronization module 512 transmits a calibration signal to the HDMI modulator 511, and the HDMI modulator 511 calibrates the content of the HDMI data based on the calibration signal.

The HDMI demodulator 521 demodulates the received HDMI data to generate the audio data A2, and transmits the audio data A2 to an audio processing circuit 524. The audio processing circuit 524 comprises a codec 5241 to decode the audio data A2 to generate an analog audio signal A3, where the codec 5241 can be implemented by a dedicated audio processing integrated circuit or a processor. The analog audio signal A3 is then transmitted to an amplifier 5242. In one embodiment, the amplifier 5242 filters out the highfrequency portion of the analog audio signal A3, thus, the audio pattern as described in FIG. 2 or FIG. 3 will is filtered out. The timestamp module 522 may receive a signal at nodes N1, N2, or N3 based on design requirements since the delays of the audio signal at the nodes N1, N2, and N3 are different.

In FIG. 5, the VR device 52 comprises a video transmission path and an audio transmission path. The video transmission path starts from the HDMI demodulator 521 to the timestamp module 522 by passing through the display device 523. The audio transmission path starts from the HDMI demodulator 521 to the timestamp module 522 by passing through the nodes N1, N2 or N3. The video path delay (i.e. the second delay) in the video transmission path may be different from the audio path delay (i.e. the first delay) in the audio transmission paths, and one objective of the host device 51 is to synchronize the video data and the audio data to be played on the VR device 52.

Figure 6A:
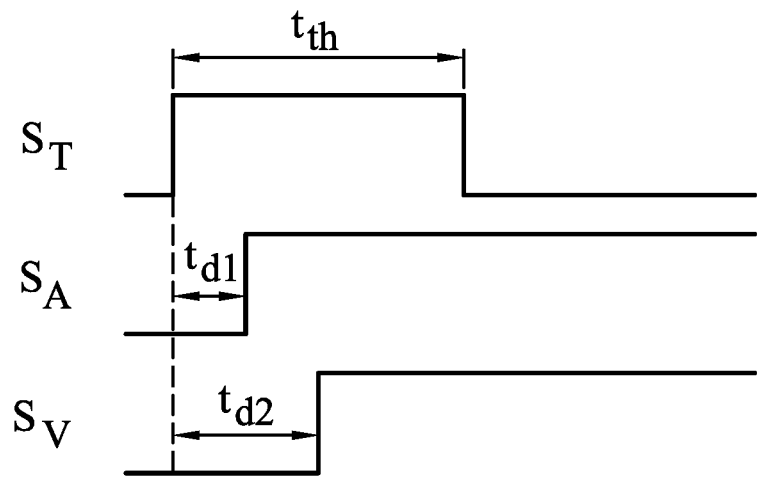
FIG. 6A is a waveform diagram showing delays of the audio data and the video data in accordance with an embodiment of the invention.

FIG. 6A is a waveform diagram showing delays of the audio data and the video data in accordance with an embodiment of the invention. Referring to FIG. 6A, the audio signal $S_A$ leads the video signal $S_V$ by a time period ($t_{d2}$-$t_{d1}$), where $t_{d2}$ is larger than $t_{d1}$. The signal $S_T$ denotes a threshold signal. If any of the time delays $t_{d1}$ and $t_{d2}$ is larger than the threshold $t_{th}$, the host device 51 will not calibrate the synchronization error occurred in the VR device 52. The host device 51 will re-transmit the audio signal and the video signal to the VR device 52. IF the both the time delays $t_{d1}$ and $t_{d2}$ are not longer than the threshold $t_{th}$, the host device 51 will calibrate the synchronization error based on the time difference ($t_{d2}$-$t_{d1}$) between the audio signal $S_A$ and the video signal $S_V$.

Figure 6B:
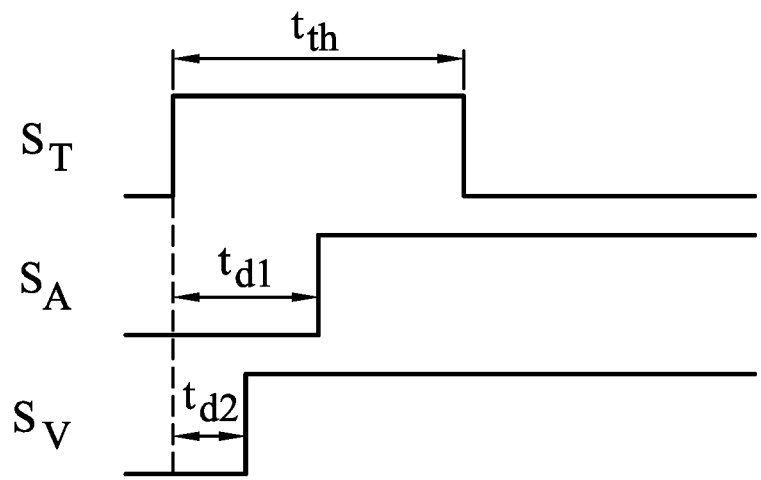
FIG. 6B is a waveform showing delays of the audio data and the video data in accordance with another embodiment of the invention.

FIG. 6B is a waveform showing delays of the audio data and the video data in accordance with another embodiment of the invention.

Referring to FIG. 6B, the video signal $S_V$ leads the audio signal $S_A$ by a time period ($t_{d1}$-$t_{d2}$). The signal $S_T$ is a threshold signal. If any of the time delays $t_{d1}$ and $t_{d2}$ is larger than the threshold $t_{th}$, the host device 51 will not calibrate the synchronization error occurred in the VR device 52. The host device 51 will re-transmit the audio data and the video data to the VR device. If both the time delays $t_{d1}$ and $t_{d2}$ are not longer than the threshold $t_{th}$, the host device 51 will calibrate the synchronization error based on the time difference ($t_{d1}$-$t_{d2}$) between the audio signal $S_A$ and the video signal $S_V$.

Figure 7:
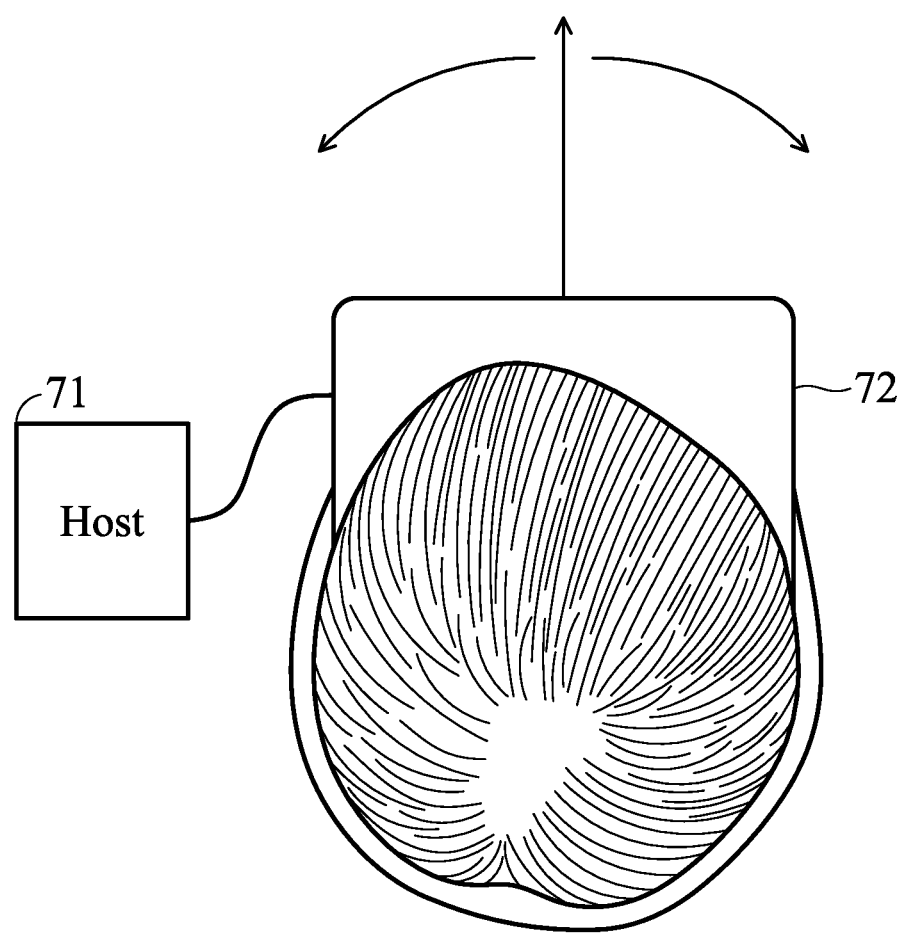
FIG. 7 is a schematic diagram showing a VR device and a host in accordance with an embodiment of the invention.

FIG. 7 is a schematic diagram showing a VR device and a host in accordance with an embodiment of the invention. Referring to FIG. 7, the user wears the VR device 72 on his head, and the VR device 72 receives audio data and video data from the host device 71. In normal usage, when the user keeps his viewing angle (e.g. looking straightforward), it is easier for the VR device 72 to synchronize the audio data with the video data. Once the user turns his head clockwise or counterclockwise, the video data may be delayed after the audio data because more video processing should be performed on the video data. Accordingly, a trigger mechanism is further disclosed in the invention to enable the synchronization method as described above.

In an embodiment, the VR device 72 comprises a position sensor to detect the horizontal and vertical angular movement of the VR device 72. The VR device 72 may determine whether the horizontal angular movement (i.e. turning clockwise or counterclockwise on the X/Y plane) of the VR device 72 is larger than a first predetermined threshold (e.g. 1~5 degrees) according to sensor data from the position sensor. When it is determined that the horizontal angular movement of the VR device 72 is larger than the first predetermined threshold, the VR device 72 will transmit a trigger signal to the host device 71 to enable the synchronization method. In another embodiment, a gyroscope is deployed in the VR device 72 to detect whether the vertical angular movement (i.e. tilt up and down) that is larger than a second predetermined threshold. When it is determined that the vertical angular movement of the VR device 72 is larger than the first predetermined threshold, the VR device 72 will transmit another trigger signal to the host device 71 to enable the synchronization method.

The synchronization method described in the aforementioned embodiments is very useful to enhance the user's experience of VR device. However, if the host device 71 executes the synchronization method repeatedly, the system resources of the host device 71 may be wasted. To solve the resource wasting issue, some parameters (e.g. the first and second predetermined thresholds as described above) are set as trigger conditions to perform the above-mentioned synchronization method.

Figure 8:
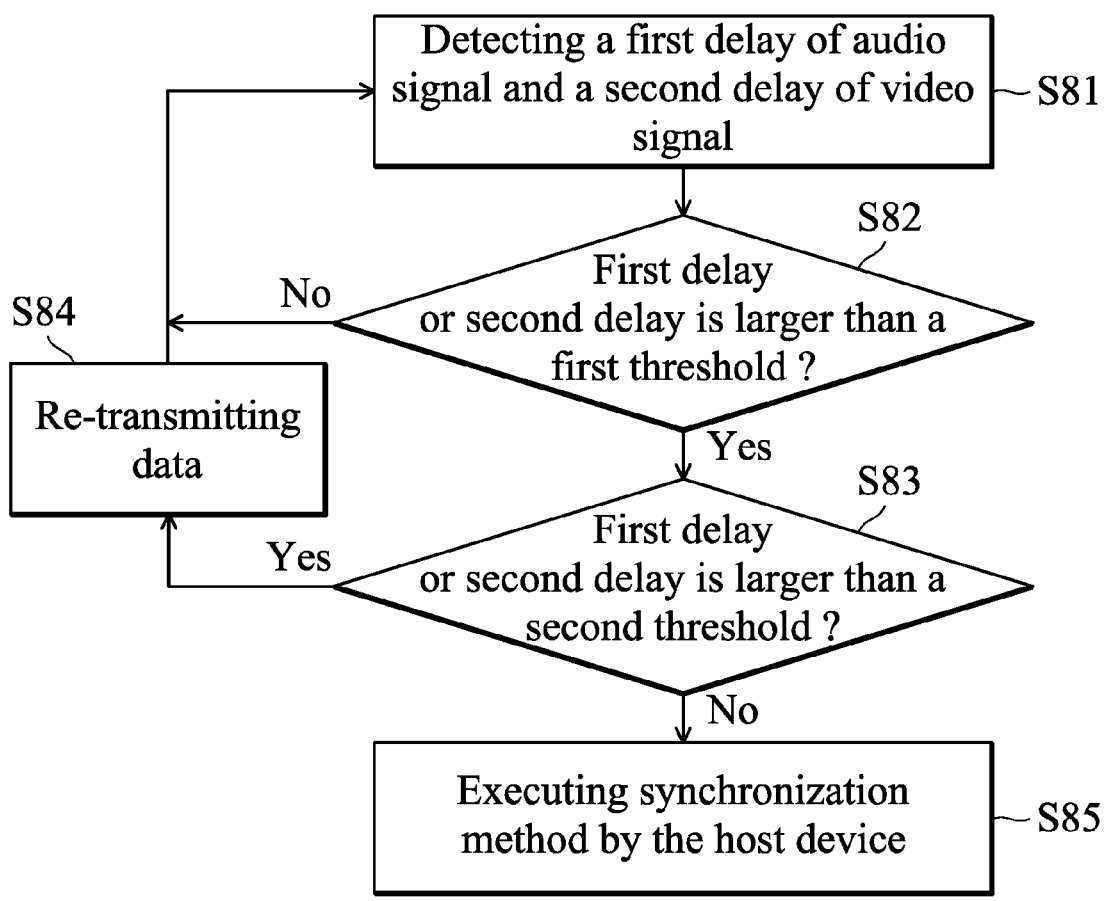
FIG. 8 is a flowchart showing a method for monitoring synchronization between video data and audio data in the VR device in accordance with another embodiment of the invention.

FIG. 8 is a flowchart showing a method for monitoring synchronization between video data and audio data in the VR device in accordance with another embodiment of the invention. In step S81, the host device detects a first delay of audio signal and a second delay of video signal in the VR device. The first delay and the second delay may differ due to different processing times in their respective transmission paths, the hardware configuration of the VR device, and/or the software resource of the VR device. In an embodiment, the non-synchronization between the first delay and the second delay can be solved by adjusting the data transmission timing (i.e. can be transmission timing for the video data or audio data) in the host device. In another embodiment, the VR device may synchronize the internal video data and audio data using a similar synchronization method described above.

In step S82, the host device determines whether any of the first delay and the second delay is longer than a first threshold. If both the first delay and the second delay are not longer than the first threshold, it indicates that the first delay and the second delay can be tolerated, and the host device will do nothing until it is determined that any of the first delay or the second delay is longer than the first threshold.

Generally, the human ear cannot detect an audio delay less than 16 ms (i.e. about 1/60 second) that can be set as the default first threshold. However, the detectable audio delay may vary from person to person, and thus the first threshold can also be set according to user experience.

Generally, the video data displayed on the VR device may have a frame rate of 24, 30, or 60 frames per second, and thus the second threshold can be set as (1/24), (1/30), or (1/60) second.

In another embodiment, the host device is only concerned with the difference between the first delay and the second delay. When the host device determines that the difference is greater than the first threshold, the host device performs the synchronization method described above.

In step S83, the host device further determines whether the first delay or the second delay is longer than a second threshold. If both the first delay and the second delay are not longer than the second threshold, step S85 is performed, and the host device performs the synchronization method described above. If any of the first delay and the second delay is longer than the second threshold, step S84 is performed. In the embodiment, the determination steps S83 and S82 are implemented in the host device. Alternatively, the determination steps S83 and S82 can be implemented in the VR device. Only when the VR device determines that the non-synchronization between the audio data and video data in the VR device cannot be tolerated, the VR device will directly transmit a trigger signal to the host device to request the host device to perform the synchronization method described above.

In step S84, the audio data and video data is re-transmitted to the VR device by the host device because the first delay or the second delay is too large to be tolerated by the VR device. When the host device re-transmits the audio signal and the video signal to the VR device, the host device will keep monitoring the synchronization status between the audio data and the video data in the VR device. If the host device determines that the first delay or the second delay is still larger than the second threshold, the host device will perform the synchronization method again to solve the problem.

In another embodiment, the synchronization method comprises a coarse calibration method and a fine calibration method. Regarding the coarse calibration method, the leading signal (i.e. can be audio data or video data) is delayed by a predetermined threshold delay, such as $t_{th}$ shown in FIG. 6A or 6B. The fine calibration method is the synchronization method described above. When the coarse calibration method has been performed, the host device further performs the fine calibration method to correct the non-synchronization issue between the audio data and video data in the VR device.

In another embodiment, when the host device determines that the first delay or the second delay is longer than the second threshold, the host device may stop some tasks, threads, or programs that have priorities lower than an application program, such as a VR game, being executed in corporation with the VR device. Then, the host device will determine whether the non-synchronization issue occurred in the VR device has been improved (i.e. the difference of the first delay and second delay is decreased). If the non-synchronization issue has been improved, the host device will perform step S83 again to check whether the first delay or the second delay is longer than the second threshold. If so, the host device will stop more tasks, threads, or programs, and only necessary programs for the operations of VR device are running on the host device.

In another embodiment, when the host device detects that the first delay or the second delay is still larger than the second threshold, the host device performs step S84 to re-transmits the audio signal and the video signal to the VR device. If the host device still determines that the first delay or the second delay is not longer than the second threshold after the host device has stopped some tasks, threads, or programs, the host device will perform the synchronization method again to correct the non-synchronization.

Figure 9:
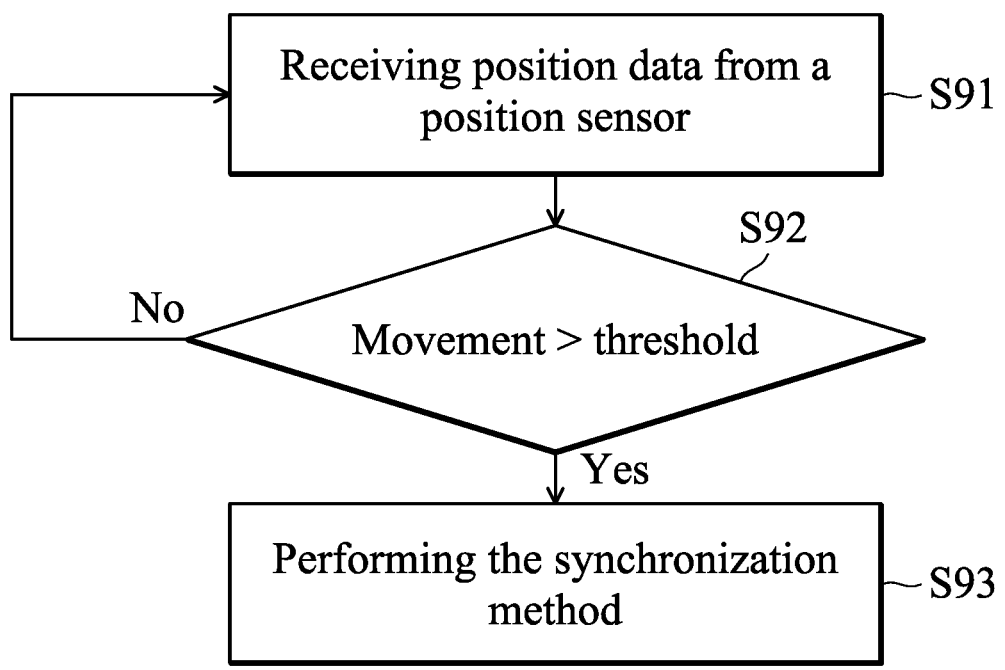
FIG. 9 is a flowchart showing a method for monitoring synchronization between video data and audio data in the VR device in accordance with another embodiment of the invention.

FIG. 9 is a flowchart showing a method for monitoring synchronization between video data and audio data in the VR device in accordance with another embodiment of the invention. In step S91, the host device receives sensor data from a position sensor of the VR device and determines the motion of the VR device. It should be noted that the user cannot be fully stationary while wearing the VR device, and there are always motions of the VR device. The motion may be a horizontal displacement, a vertical displacement, a horizontal rotation, a vertical rotation, or a combination thereof. In other words, the motion may be expressed as a displacement value and/or a rotation angle.

In step S92, when the host device determines that the motion is larger than a threshold, step S93 is performed, and the host device performs the synchronization method to solve the non-synchronization problem between the audio data and the video data. It should be noted that step 92 is expressed simply, and a person skilled in the art will appreciate that different threshold values can be set for the displacement and rotations of the VR device. Specifically, when the displacement of the VR device is larger than a first threshold (e.g. in centimeters) or the rotation angle of the VR device is larger than a second threshold (e.g. in degrees), the host device will determine that the overall motion of the VR device is beyond the tolerance limit for audio-video synchronization, and the synchronized method should be performed. If it is determined that the motion is not larger than the threshold, the host device will repeatedly monitor the synchronization status between the audio data and the video data in the VR device until the host device determines that the audio data and the video data are synchronized in the VR device.

In this embodiment, steps S91~S93 are performed by the host device. In another embodiment, the steps S91 and S92 can be performed by a processor of the VR device. When the VR device performs steps S91 and S92 and determines that the movement is larger than the threshold, the VR device will transmit a trigger signal to the host device, and the host device then performs step S93.

In another embodiment, if the performance of the processor of the VR device is sufficient, the step S93 can also be performed by the processor of the VR device. The processor of the VR device will try to correct the non-synchronization issue between the audio data and video data. When the processor of the VR device determines that the non-synchronization issue cannot be solved by itself (i.e. when the difference between the first delay and the second delay is large), the processor will transmit a request signal to the host device, so that the host device may take control of the synchronization procedure between the audio data and video data that was previously performed by the processor of the VR device.

Although the methods shown in FIG. 8 and FIG. 9 are illustrated as different flows, a person skilled in the art can combine or mix steps in FIG. 8 and FIG. 9 to create a new flow. For example, steps S82, S83 and S92 can be combined into a new flow.

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for audio-video synchronization in a virtual reality (VR) system, wherein the VR system comprises a VR device and a host device, the method comprising:
   connecting the VR device to a host device via a data transmission interface;
   transmitting an audio signal and a video signal from the host device to the VR device;
   estimating time delay information in an audio transmission path and a video transmission path of the VR device;
   transmitting a feedback signal recording the time delay information from the VR device to the host device external to the VR device;

adjusting timing of the audio signal or the video signal transmitted from the host device to the VR device according to the feedback signal;

determining whether a first delay of the audio signal and a second delay of the video signal in the audio transmission path and the video transmission path in the VR device is longer than a first threshold;

determining whether the first delay or the second delay is longer than a second threshold when it is determined that the first delay or the second delay is longer than the first threshold;

when it is determined that neither the first delay nor the second delay is longer than the second threshold, adjusting timing of the audio signal or the video signal transmitted from the host device to the VR device according to the feedback signal; and when it is determined that either the first delay or the second delay is longer than the second threshold, re-transmitting the audio signal and the video signal from the host device to the VR device.

2. The method as claimed in claim 1, further comprising:
determining the first delay of the audio signal and the second delay of the video signal in the audio transmission path and the video transmission path in the VR device, respectively.

3. The method as claimed in claim 2, wherein the time delay information records the first delay and the second delay.

4. The method as claimed in claim 2, wherein the time delay information records a different between the first delay and the second delay.

5. The method as claimed in claim 2, further comprising:
estimating the first delay of the audio signal in the audio transmission path by detecting an audio pattern with a specific tone of the audio signal; and estimating the second delay of the video signal in the video transmission path by detecting a timestamp embedded in the video signal.

6. The method as claimed in claim 5, wherein the timestamp records a first time that the host device starts to transmit the video signal to the VR device, and a second time that the VR device has demodulated the video signal from the host device.

7. The method as claimed in claim 6, wherein the timestamp records a time interval between the first time and the second time.

8. The method as claimed in claim 5, wherein the audio pattern with the specific tone is filtered out from the audio signal before the audio signal is played on the VR device.

9. The method as claimed in claim 1, further comprising:
detecting a motion of the VR device according to sensor data from a position sensor of the VR device;

determining whether the motion is larger than a predetermined threshold; and adjusting timing of the audio signal or the video signal transmitted from the host device to the VR device according to the feedback signal when it is determined that the motion is larger than the predetermined threshold.

10. The method as claimed in claim 9, wherein the motion of the VR device is a displacement value or a rotation angle.

11. A virtual reality (VR) system, comprising:
a host device; and
a VR device, connected to the host device via a data transmission interface;
wherein the host device transmits an audio signal and a video signal to the VR device, and the VR device estimates time delay information in an audio transmission path and a video transmission path of the VR device, wherein the VR device transmits a feedback signal recording the time delay information to the host device external to the VR device, and the host device adjusts timing of the audio signal or the video signal transmitted to the VR device according to the feedback signal, thereby synchronizing the audio signal and the video signal in the VR device, wherein the host device further determines whether a first delay of the audio signal and a second delay of the video signal in the audio transmission path and the video transmission path in the VR device is longer than a first threshold, and determines whether the first delay or the second delay is longer than a second threshold when it is determined that the first delay or the second delay is longer than the first threshold, wherein when it is determined that neither the first delay nor the second delay is longer than the second threshold, the host device adjusts timing of the audio signal or the video signal transmitted to the VR device according to the feedback signal, wherein when it is determined that either the first delay or the second delay is longer than the second threshold, the host device re-transmits the audio signal and the video signal to the VR device.

12. The VR system as claimed in claim 11, wherein the VR device determines the first delay of the audio signal and the second delay of the video signal in the audio transmission path and the video transmission path in the VR device, respectively.

13. The VR system as claimed in claim 12, wherein the time delay information records the first delay and the second delay.

14. The VR system as claimed in claim 12, wherein the time delay information records a different between the first delay and the second delay.

15. The VR system as claimed in claim 12, wherein the VR device estimates the first delay of the audio signal in the audio transmission path by detecting an audio pattern with a specific tone of the audio signal, and estimates the second delay of the video signal in the video transmission path by detecting a timestamp embedded in the video signal.

16. The VR system as claimed in claim 15, wherein the timestamp records a first time that the host device starts to transmit the video signal to the VR device, and a second time that the VR device has demodulated the video signal from the host device.

17. The VR system as claimed in claim 16, wherein the timestamp records a time interval between the first time and the second time.

18. The VR system as claimed in claim 15, wherein the audio pattern with the specific tone is filtered out from the audio signal before the audio signal is played on the VR device.

19. The VR system as claimed in claim 11, wherein the host device detects a motion of the VR device according to sensor data from a position sensor of the VR device, and determines whether the motion is larger than a predetermined threshold, wherein the host device further adjusts timing of the audio signal or the video signal transmitted to the VR device according to the feedback signal when it is determined that the motion is larger than the predetermined threshold.

20. The VR system as claimed in claim 19, wherein the motion of the VR device is a displacement value or a rotation angle.

* * * * *